United States Patent
Meek

[11] Patent Number: 6,086,016
[45] Date of Patent: *Jul. 11, 2000

[54] GYRO STABILIZED TRIPLE MODE AIRCRAFT

[76] Inventor: Stanley Ronald Meek, 2825 McKenny Crescent, Prince George, British Columbia, Canada, V2K 3X8

[ * ] Notice: This patent issued on a continued prosecution application filed under 37 CFR 1.53(d), and is subject to the twenty year patent term provisions of 35 U.S.C. 154(a)(2).

[21] Appl. No.: 09/009,853

[22] Filed: Jan. 21, 1998

[30] Foreign Application Priority Data

Jan. 21, 1997 [CA] Canada ..................................... 2195581

[51] Int. Cl.$^7$ ................................................ B64C 27/00
[52] U.S. Cl. ..................................... 244/17.11; 244/17.19; 244/23 C; 244/17.23; 244/39; 416/223 R
[58] Field of Search ............................. 244/17.19, 17.11, 244/12.2, 23 C, 39, 6, 34 A, 17.23; 416/189, 192, 128, 129, 223 R

[56] References Cited

U.S. PATENT DOCUMENTS

| | | | |
|---|---|---|---|
| 2,673,051 | 3/1954 | Frost | 244/17.19 |
| 3,122,342 | 2/1964 | Weir | 244/17.11 |
| 3,288,396 | 11/1966 | Gonin | 244/17.23 |
| 4,195,800 | 4/1980 | Wallace | 244/17.11 |
| 4,301,981 | 11/1981 | Hartt | 244/12.2 |
| 4,506,849 | 3/1985 | Lemont | 244/17.21 |
| 4,560,358 | 12/1985 | Adler | 446/46 |
| 4,811,627 | 3/1989 | Mouille | 74/665 |
| 4,913,376 | 4/1990 | Black | 244/17.11 |
| 5,190,242 | 3/1993 | Nichols | 244/12.2 |
| 5,240,204 | 8/1993 | Kunz | 244/6 |
| 5,297,759 | 3/1994 | Tilbor et al. | 244/17.11 |
| 5,503,351 | 4/1996 | Vass | 244/12.2 |
| 5,544,844 | 8/1996 | Groen et al. | 244/17.11 |
| 5,791,592 | 8/1998 | Nolan et al. | 244/17.19 |

FOREIGN PATENT DOCUMENTS 2087232  7/1993  Canada .

Primary Examiner—J. Woodrow Eldred
Attorney, Agent, or Firm—Murray E. Thrift; Adrian D. Battison; Michael R. Williams

[57] ABSTRACT

A triple mode aircraft which can take off as a helicopter, or in gyrocopter mode with no power to the rotors or as a conventional aircraft obtaining lift from a circular wing and in another embodiment from short stub wings; a canard wing and high lift tailplane. So it combines the flexibility of a helicopter with the same efficiency and safety of a gyrocopter and a fixed wing aircraft, also has the same simplicity and efficiency of flying a helicopter that doesn't have a tail rotor to worry about. The rotor craft includes two counter-rotating rotors with weighted tips on one set of rotors or a circular airfoil (CA) attached to at least one set of rotors. This CA gives the lift to function as a conventional aircraft, it also weights the tips of the rotor to give a gyro-stabilizing effect to the whole aircraft. Also there is a down draft rudder that functions as a rudder in horizontal flight or catches the down draft from the rotors for directional control. There is a conventional horizontal tail with elevator controls which can be differentially operated for additional control.

10 Claims, 6 Drawing Sheets

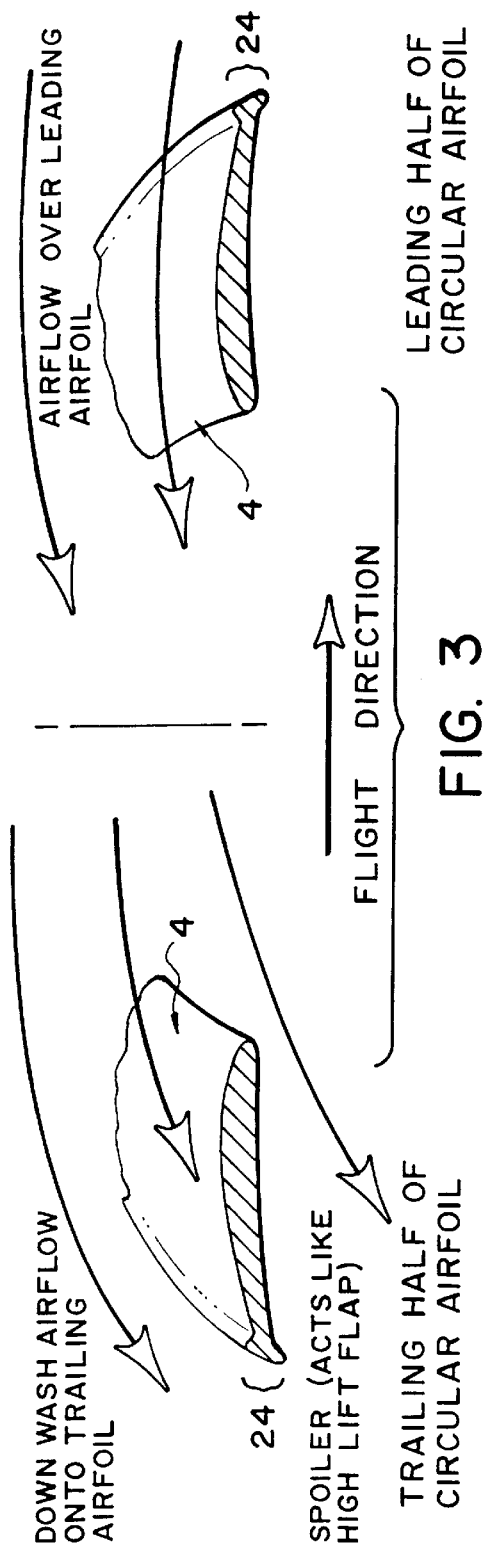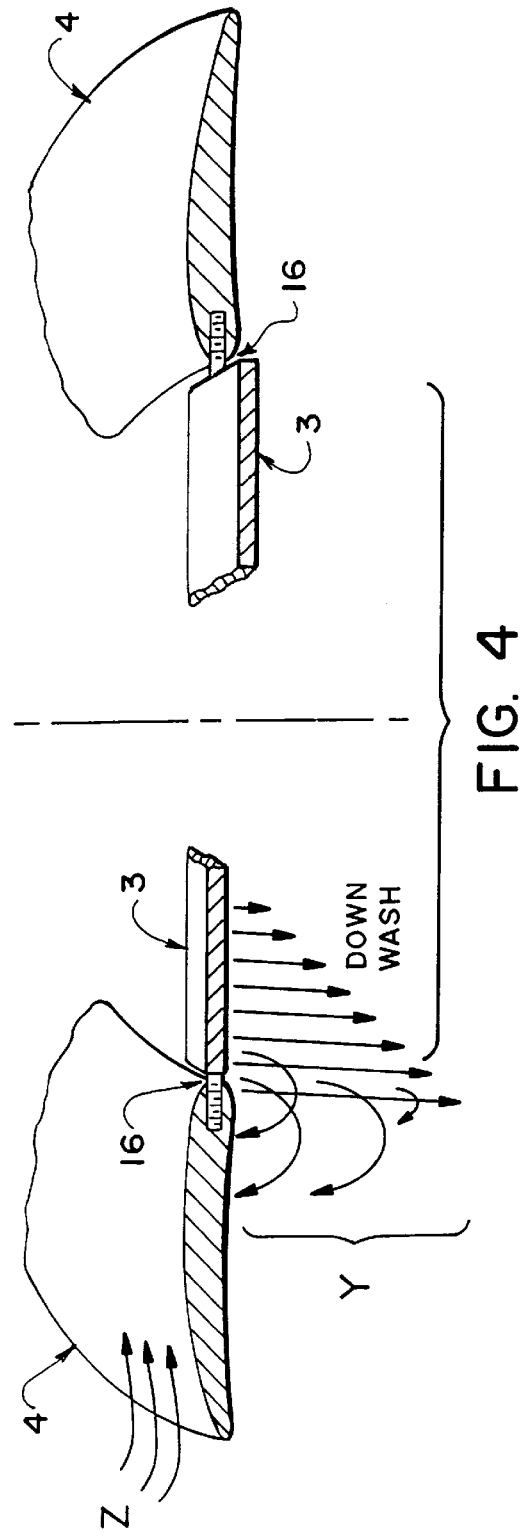

GYRO STABILIZED TRIPLE MODE AIRCRAFT

BACKGROUND OF THE INVENTION

Rotary wing aircraft such as helicopters have found many application due to the vertical flight and hovering capabilities of such craft. These capabilities are achieved through the use of rotary wings, i.e., rotor blades having an airfoil cross-section. As used herein, the term "airfoil" refers to shapes capable of generating lift due to airflow thereabouts from a leading to a trailing edge. Rotary wing aircraft are thus capable of generating lift even in vertical flight or while hovering because the rotary motion causes airflow about the surfaces of the rotary wings.

A disadvantage of conventional rotary wing aircraft, i.e., helicopters employing a single main rotor blade assembly in their principal lift generating systems, is that such aircraft generally employ a heavy and power consuming tail rotor for torque compensation and yaw control. Torque is exerted on conventional rotary wing aircraft due to the rotation of the main rotor blade assembly which would result in rotation of the aircraft body if not counteracted. Typically, this torque is counteracted by use of a tail rotor which generates a torque equal but opposite to that of the main rotor blade assembly. The pitch of the tail rotor blades may also be adjustable to vary the torque generated by the tail rotor thereby providing helicopter yaw control. Thus, in conventional helicopters, a significant amount of power and weight is dedicated to the tail rotor for torque compensation and yaw control. This extra mechanism makes it far more difficult to fly and to maintain. This also makes the aircraft more unsafe not only because its harder to fly, but also because the spinning tail rotor could strike someone or something.

Another disadvantage of conventional rotary wing aircraft is the inefficiency and complexity of forward flight relative to fixed wing aircraft. In conventional rotary wing aircraft, a forward thrust is provided by angling the main rotor blade assembly relative to vertical so that a component of the force generated by the assembly is directed forward. By contrast, in a fixed wing aircraft, substantially all of the force generated by a propulsion assembly, such as a propeller or a jet engine, may be directed to provide a forward thrust.

In addition, conventional rotary wing aircraft generally employ a cyclical pitch control assembly to compensate for varying relative air speeds experienced by the rotor blades in forward flight. In rotation the rotor blade has an advancing portion, where the blade is rotating into the "wind" resulting from forward movement of the aircraft, and a retreating portion where the blade is rotating away from the wind. The speed of air relative to a rotor blade section and the force generated by the section in forward flight depends in part upon two components: the speed of forward flight and the speed of the rotor blade section due to rotation of the rotor assembly. As can be understood, these components will be generally additive during the advancing portion of a rotation and generally subtractive at the retreating portion. A complicated cyclical pitch assembly is generally employed in conventional rotary wing aircraft to vary the pitch of the rotor blade over a rotation cycle so that a substantially symmetrical lift and thrust distribution results. To facilitate forward flight, the rotor of conventional rotary wing aircraft is therefore complex in design and operation and generally inefficient in comparison with fixed wing aircraft. Another disadvantage is that it is very difficult to use a propulsion launched parachute to afford a soft landing, in an emergency, for pilot, crew and aircraft.

Thus, it would be advantageous if the positive attributes of fixed wing and rotary wing aircraft could be combined. Desirably, such a rotary wing aircraft could combine the hovering and vertical flight capability of rotary wing aircraft with the efficiency and simplicity of fixed wing aircraft in forward flight. Additionally, such a craft could preferably eliminate the need for a tail rotor to compensate for rotary wing torque thereby enhancing aircraft weight and power efficiency. Also great advantages would be attained if the aircraft had gyro stability, in that it would be a smoother, safer, flying platform. Further efficiencies would result if such a craft were provided with a fixed wing capable of generating lift in both forward and vertical flight. Finally a further and most important advantage would be attained if this aircraft could have the redundancy of two drive mechanisms and power plants either of which could safely fly the aircraft if one system failed; could be landed by autorotation or by use of the fixed wing and further if all systems failed could be landed safely by the use of a parachute (aircraft, occupants, and all).

According to the present invention there is provided a helicopter main rotor, comprising:
- a hub having an axis of rotation;
- a plurality of rotor blades radiating from the hub; and
- a circular airfoil mounted on the rotor blades, coaxially with the hub, the airfoil having a chord of up to 20% of the rotor radius and a thickness about 15% of the airfoil chord.

The circular airfoil (CA) may be attached to the rotor blades in line with or slightly down stream from and coaxial with the rotor blades and in a plane essentially parallel to the plane of the blades for capturing vortices produced in the wash of the rotor blades. The CA shelters the rotor blades thus reducing air resistance while in forward flight. The CA increases lift, acting as a fixed wing while in forward flight. The CA ties the rotor blades together so they work together more like a disc. This also allows the inter-rotor distance to be reduced, thus further enhancing the lifting efficiency of the counter rotating rotors; which because of the added flow, would, through the synergistic effect, increase the lift of the CA. The CA further provides Gyro stabilization to the aircraft.

The cross section of the airfoil preferably has a cambered configuration. In the preferred configuration the shape is similar to that of the AEROBIE aerodynamic toy ring. The cross section of the airfoil is uniform all around the circle, i.e. the chord will be the same all around the circular airfoil and will give equal lift no matter what radial direction the edge of the circular airfoil is moving. In addition to the preferred cross sectional shape mentioned above, the airfoil could have a shape like an NACA 00012 or NACA 23015 i.e. fairly thin with little wind resistance. In other embodiments it could have a thicker cross section for slower speed, very stable operation.

In operation, the downwash produced by the main rotor is directed through the circular opening in the airfoil, capturing the vortices at the tips of the rotors. This stops the interference caused by the air re-circulating from down below the rotors and short circuiting back up to the top of the rotors. This allows more air to be drawn across the circular airfoil, causing additional lift, and moving down through the center of circular airfoil, displacing more air and enabling the rotors to also be more efficient & giving more lift, less vibration and less noise. Additional air is drawn across the upper surface of said airfoil as well as from the region adjacent to the downstream surface of the airfoil to reduce boundary layer build up, thus enhancing the lift of the airfoil.

The rotor structure provides gyro stabilization and equal lift in all flight directions. This permits flat turns versus normal banking turns, which further simplifies the operation of this aircraft.

The CA, gives the aircraft the stability and versatility to operate in three modes and allows a change to an age old method of flying, i.e. flat turns and no throttle operation. This in turn yields the following simplifications: flat turns versus needle and ball banking turns; one speed for normal operation of the rotors and a forward thrust propeller (i.e. a simple automatic control just like a cruise control). In other words, for normal operation, it is not necessary to touch the throttle. It is only necessary to use the pitch controls for the rotors and the propeller along with the rudders, and possibly the stick control at times for the flaperons as a trim control. Both for flying and for maintenance the CA configuration is simpler. None of the controls and equipment for a tail rotor are necessary, nor are the cyclical controls. With the whole aircraft being a Gyro stabilized platform, the simplicity of just up, down, and turn, type of operation makes it a real possibility for simple auto-pilot operation.

The CA equipped rotor provides reduced noise level compared to a conventional helicopter caused by interference of the rotor vortices and the high speed tail rotor vortices and also the noise caused by the chopper rotor blades cutting their own sound waves during high speed forward flight. With this invention the rotor blades, during high speed forward flight, are either feathered or almost feathered. Also the noise caused by cyclical operation is eliminated.

An aircraft equipped according to the invention has a high speed capability greater than conventional helicopters. It overcomes the standard problems with conventional helicopters: 1) unequal lift due to different airspeeds of the wind over the rotating rotors. 2) Drag due to high pitch angle of blades and due to the drag caused by the rotor tilted into the wind to give forward flight (versus flat level rotors with feathered blades), this is possible because of the circular airfoil acts like a fixed wing and gives the required lift, allowing the majority of the power to be used to drive the propeller for forward thrust.

An aircraft equipped according to the invention may have twin engines and drive systems, and a projectile launched parachute system.

The method of operation, gyro stabilized with flat turns and no need for throttle control, the circular airfoil which protects a projectile launched parachute system, and the almost zero need for use of the stick control make an aircraft equipped according to the invention a very safe airplane. It has been stated by many experts that a large majority of gyroplane accidents have been caused by pilot induced oscillation. This is also true of some helicopter accidents. This is caused by over control on the stick. Since, because of gyro stability and the new method of operation with its flat turns, there is little need to use the stick, which should eliminate these accidents. Many other accidents are caused by stalling in banked turns and improper use of throttle control. These two functions are unnecessary and therefore these accidents should be eliminated. The dual engine and drive systems give enough redundancy to eliminate engine and drive system failure caused accidents. The circular airfoil will stop a projectile launched parachute from being entangled or cut by the rotors. Therefore in a last ditch, emergency situation, the pilot could launch a parachute that would give pilot, crew and aircraft a soft landing.

A second CA may be used on a second, counter-rotating rotor. This structure would be smaller and lighter than the structure on the main rotor. When used the primary function would be to connect the blades in that rotor and make them function more like a disc. It would also function in a similar fashion to that of the main rotor, but to a lesser extent, being smaller.

The invention allows aircraft to be more versatile than the prior art. An aircraft equipped according to the invention can function as a very easy to fly, easy to maintain helicopter; gyroplane and fixed wing airplane; in other words it is a convert-a-plane that can convert to any of the three cited modes while flying.

The AEROBIE type airfoil profile, when attached to the rotor blades gives a balanced lift which allows the gyro stability to function in such a manner that the circular airfoil will not tend to precess and therefore will maintain a horizontal orientation, normally, without use of other trim controls. Other airfoil profiles, without the spoiler, may be used to give more efficient lift. To overcome the consequent reduced stability, the pilot would have to use the trim controls to maintain stable horizontal flight.

The rotor drive system may allow the pilot to stop the rotor from being driven by either or both of the two engines.

BRIEF DESCRIPTION OF THE DRAWINGS

FIG. 3 is a cross-sectional view along line A—A in FIG. 1;

FIG. 4 is two cross sectional views along B—B and B'—B' of FIG. 2;

DETAILED DESCRIPTION

Figure 1:
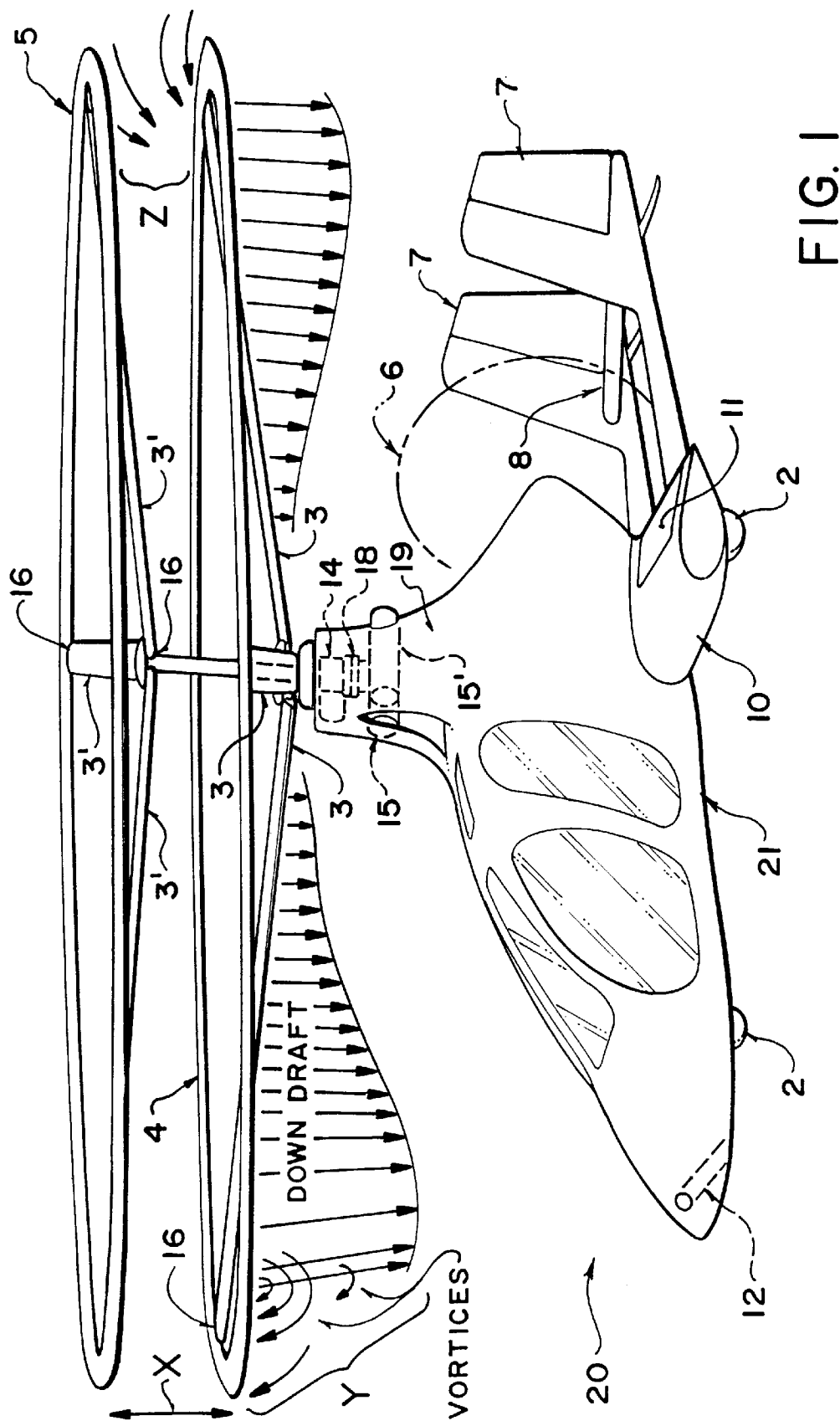
FIG. 1 is a perspective diagrammatic view of the preferred embodiment of a triple mode aircraft constructed in accordance with this invention.
Figure 2:
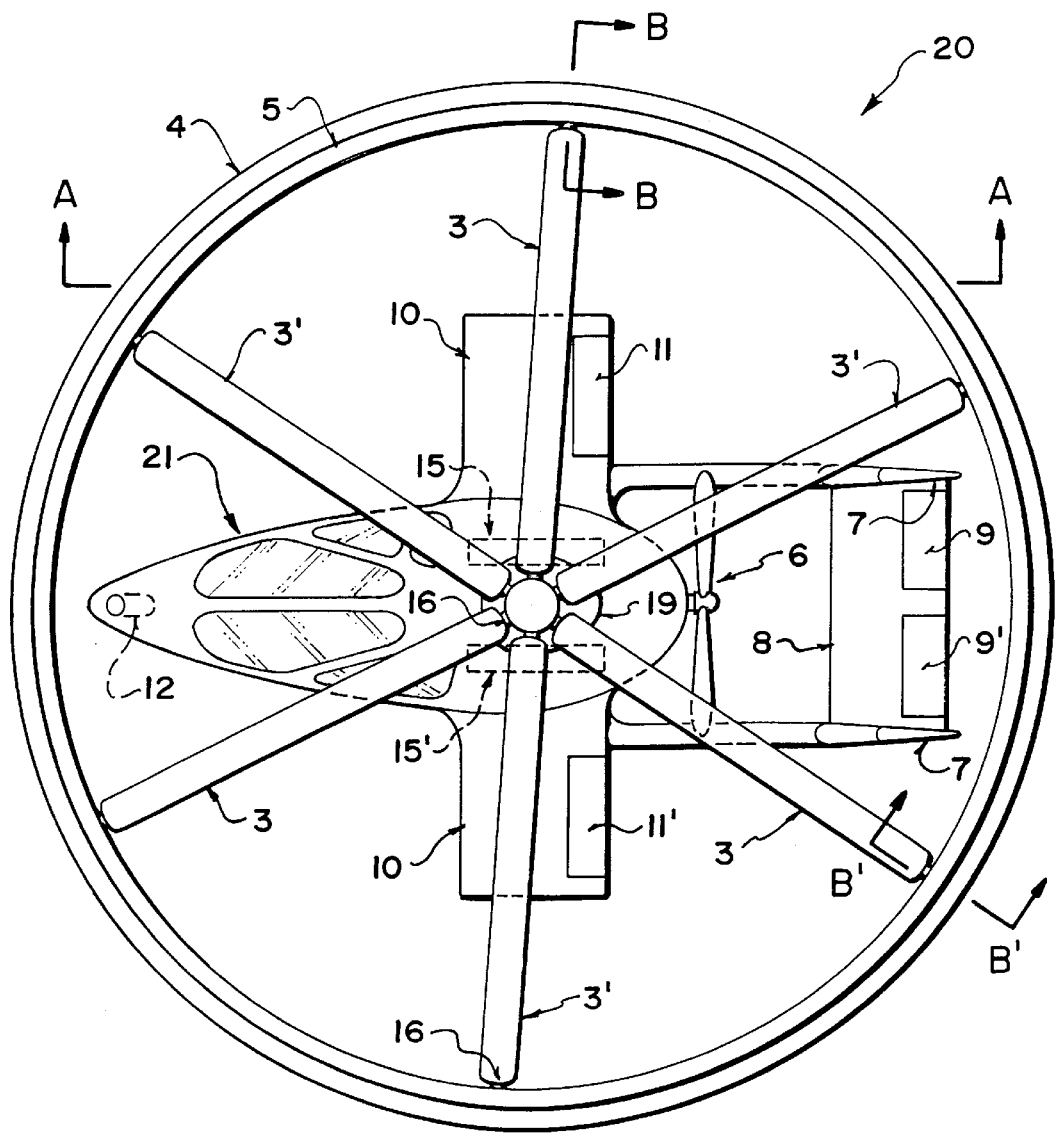
FIG. 2 is a top plan view of the aircraft shown in FIG. 1.

Referring to the drawings, FIGS. 1 through 4 illustrate an aircraft 20 that includes a fuselage 21, which is suspended from coaxial; counter-rotating; synchronized; rotors 3 and 3', in pendulum fashion (while flying). This suspension is mounted on a gimbal system with a mast that is universally tiltable and with controllable pitch rotors, for control.

The top rotor 3' and the bottom rotor 3 have three blades each. In the preferred embodiment, these blades are rigid, short blades and symmetrical in configuration, permitting the rotor and CA combined to operate effectively irrespective of the flow direction. These blades have attached to them circular airfoils 4 and 5 which give the gyro stabilization for the aircraft and also store energy for jumpstart takeoffs in the gyro mode and vertical lift in high speed fixed wing type mode.

The aircraft is powered by engines 15 and 15'. These may be wankel engines, turbines or other types. The rotors are driven from the engines through a clutch 18 allowing the power to be disengaged from the rotors. If turbines are used, louvers can be installed in the aerodynamic hub fairing 19 to help in the yaw control of the aircraft, possibly eliminating the rudder controls. Additionally, swivels 16 at both ends of the rotor blades allow the pitch to be controlled as with a conventional helicopter. The rotor controls consist of gimballed and collective pitch controllers, contained within an aerodynamic hub fairing, 19. These provide the option of control of the aircraft in helicopter flight however because of the gyro stabilization effect of the circular airfoil attached to the rotor the gimballed control is normally not required. Yaw control is achieved through the combination, down draft/ standard type, rudders 7, and/or the louver control, 28, from engine exhaust. There is very little yaw stabilization necessary because of the counter-rotating rotors which cancel out the normal torque effect in a helicopter. Therefore a substantial efficiency is obtained over a standard helicopter.

The aircraft 20 illustrated in FIG. 1 is capable of flight in helicopter mode using the powered counter-rotating, synchronized, rotors. It is also operable in a fixed wing mode where the CA does the same job as a fixed wing, whether fixed or rotating. In a third mode it can fly as a conventional gyrocopter with the propeller 6 providing forward propulsion and the rotors freewheeling and giving the vertical lift. In addition, the rotors can be rotated to an acceptable speed and then turned loose to free wheel, which will store up sufficient energy with the help of the CA momentum to give a jump start takeoff. This craft may be landed in the same way as a standard gyrocopter with a rolling landing or vertical takeoff/landing using the stored energy in the CA. Because of the helicopter capability, it should be noted, that about the only time it would be advantageous to fly in the gyrocopter mode would be for training pilots how to fly a conventional gyrocopter (with auto-rotation, etc.) and if the rotor drive system should happen to fail then it could be flown and landed as a standard gyrocopter; also as a conventional aircraft using the horizontal propeller for power and the CA for lift.

The fixed wing, horizontal flight mode is identical to helicopter mode and is reached when the aircraft obtains a speed giving vertical stabilization, enabled by a horizontal propeller 6, and the CA 4 and/or 5, assisted by the high lift flaperons 9 and 9', on the horizontal tail plane and the flaperons, 11 & 11', on the stub wings. At this stage the pitch controls on the rotors would be feathered or near feathered, as little or no lift would be required from them. The controls that can assist in this mode are the cyclic rotor control and the roll & elevator control, achieved through differential deflection of flaperons 11 and 11' and 9 and 9' on both the stub wings and the tail plane. The rotors can be stopped in position shown in FIG. 8 by the existing drives and held in that position by a detent and spring controlled cam apparatus. This position can give less drag in the long range, high speed, forward flight mode and a better lift configuration in the alternate embodiment described below, with reverse pitch settings. However, even though these rotors are short and rigid they do have a limited bending moment when not rotating. Though the design structure is built in, it is possible that in practice this fixed position may only be used while on the ground; during run-up, taxiing, (or in emergency situations, while in the air).

FIG. 1 shows a stub wing 10 which partially houses the wheels, 2, and flaperons, 11 & 11'. This may be omitted in other embodiments. Also illustrated in FIG. 1 is a projectile launched parachute system 12. The parachute may be launched in emergency situations to lower the aircraft to the ground. The circular airfoils prevent the parachute lines from entanglement in and damage from the rotor blades.

FIG. 3 illustrates an "AEROBIE" type airfoil. This airfoil configuration is described in U.S. Pat. No. 4,560,358 issued Dec. 24, 1985 to Alan J. Adler. This airfoil has been used as a stand alone toy, marketed under the trademark "AEROBIE". The drawing indicates the direction of travel of the aircraft, the general flow pattern of the air over the circular airfoil (CA) i.e. after leaving the leading half of the CA the air is directed down on the trailing half of the CA, thus putting a downward force on the trailing portion of the CA and also reducing the lift because of the direction of flow. However the shape of the airfoil corrects the unbalance of lift between leading and trailing half of the CA. At point 24 on the leading half, the shape of the airfoil acts like a spoiler and reduces the lift of the leading portion of CA whereas on the trailing half at corresponding point 24, with the air movement in reverse, the shape of the airfoil acts like, a high lift flap, giving an increased lift. Thus the circular airfoil now would have equal lift all around and even when spinning as a Gyro it would not be forced up 90 degrees to the leading edge (which is a Gyro's built in reaction). Thus this airfoil shape tends to solve this down wash airflow problem.

The airfoil cross section has a cambered configuration. The cross section is uniform all around the circle i.e. the chord is the same all around the circular airfoil and will give equal lift no matter what radial direction, the edge of the circular airfoil is moving. In addition to the preferred cross sectional shape mentioned above it could have a shape like an NACA 00012 or NACA 23015 i.e. fairly thin with little wind resistance but in another embodiment it could have a thicker cross section for slower speed very stable operation.

FIG. 4 illustrates the pivot point 16 between CA 4 and a rotor blade 3, it also shows the air forced down by the rotors and CA, labelled down draft, and the vortices at point y caused by the tips of the rotor blades and blocked by the circular airfoil. This blocks short circuiting of the air from the bottom of the rotor to the top. Thus the efficiency of the rotors is increased and more air is moved down, which causes more air to be drawn across the lifting surface of the CA at point z and improving it's efficiency, giving the two of them, working together, a synergistic effect.

Figure 5:
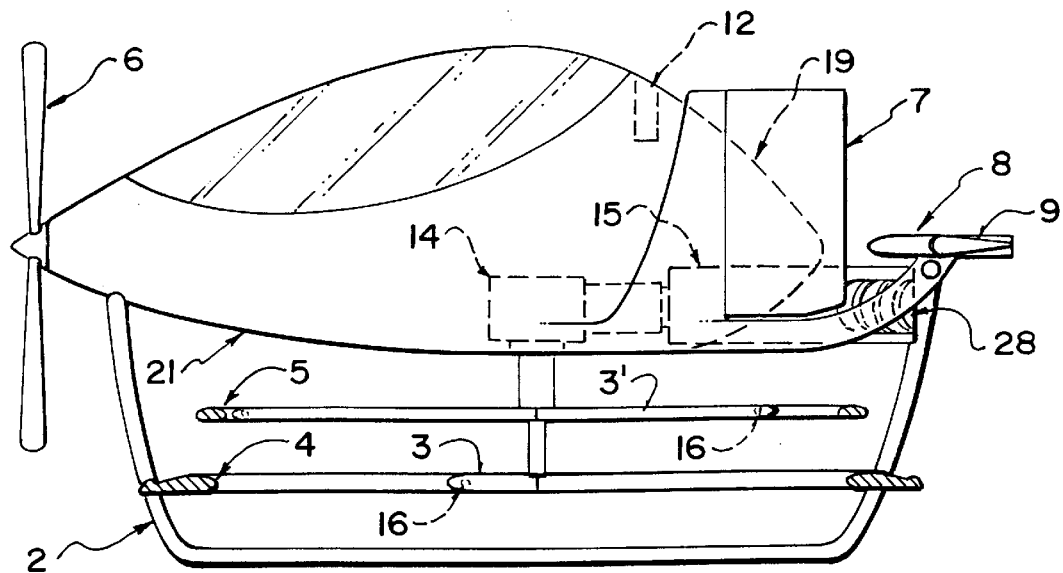
FIGS. 5 and 6 are side and top views respectively of another embodiment.
Figure 6:
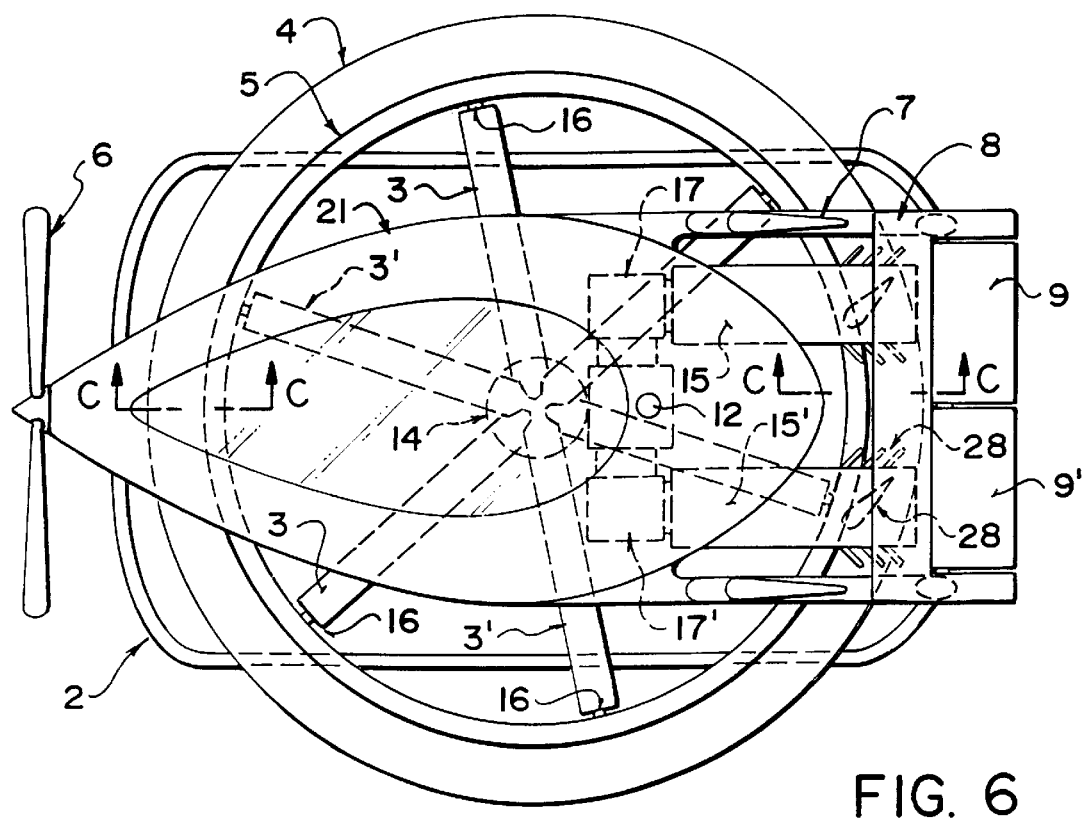

FIGS. 5 and 6 illustrate an alternate embodiment of the invention with a tractor propeller 6, skids 2' instead of wheels, the rotors and CA mounted below the fuselage and an engine exhaust deflector, 28, which can give yaw control. The rotors 3 and 3' are driven by the twin motors 15 and 15' through drive systems 17 and 17' and counter rotating drive 14.

Figure 7:
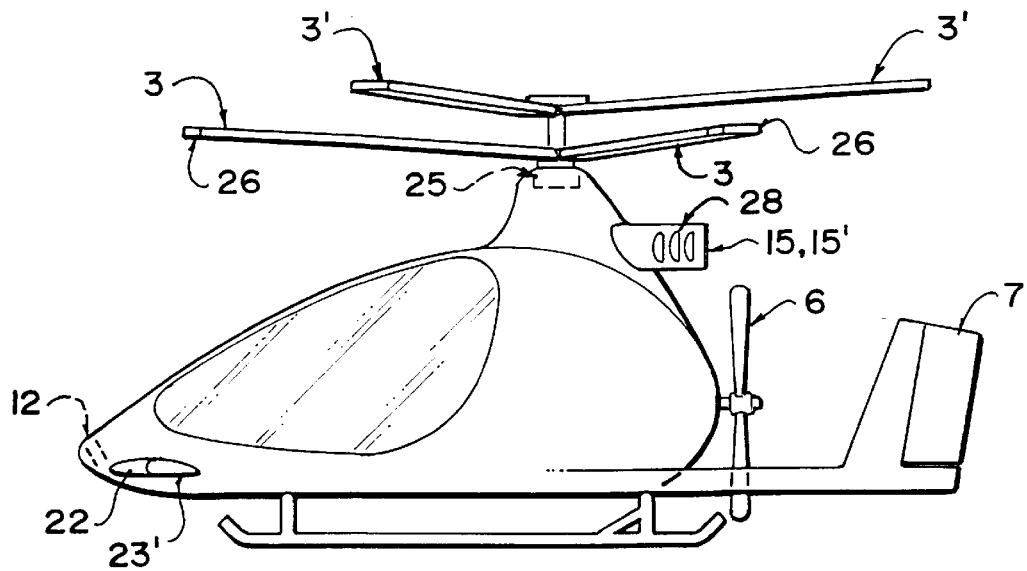
FIGS. 7 and 8 are side and top views respectively of another embodiment.
Figure 8:
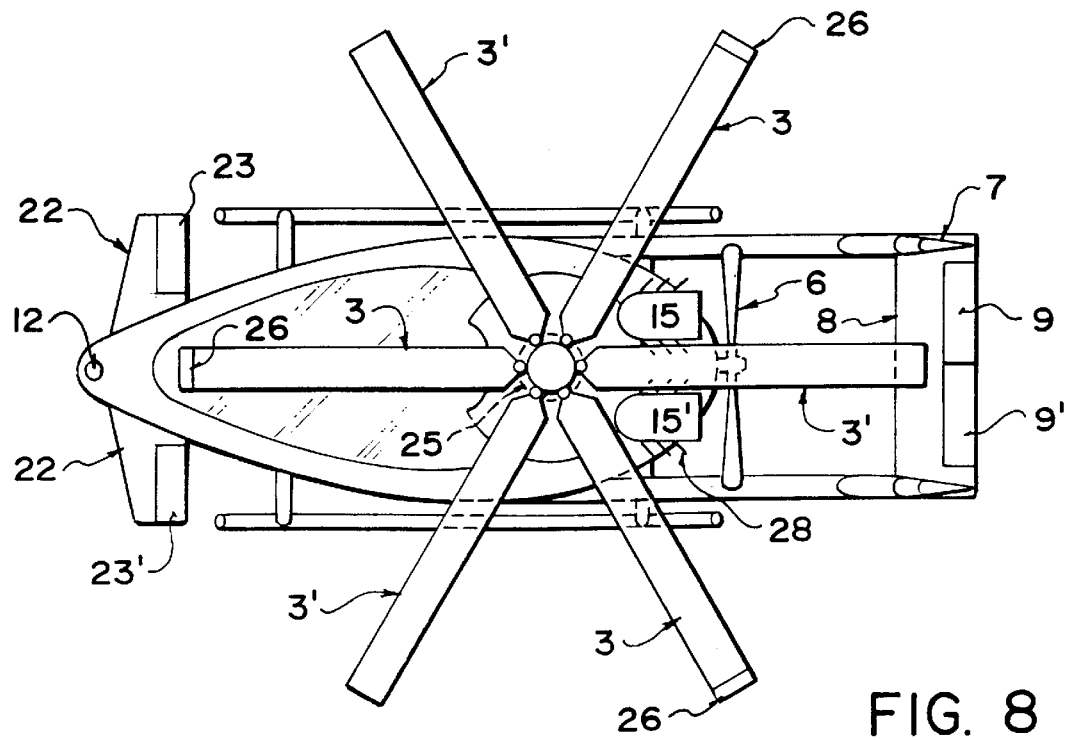

FIGS. 7 and 8 illustrate a further embodiment without the circular airfoil, instead some of the rotor tips are weighted to give the Gyro stability. In order to obtain sufficient lift and control for high speed forward flight a canard wing 22 is added with flaperons 23 & 23'. Louvers 28 are used for exhaust gas yaw control. A detent mechanism 25 is shown holding rotors, 3 and 3' in the preferred position, for high speed, forward flight. A stub wing may be added to provide additional lift in high speed forward flight, when rotors are feathered, for less drag.

Figure 9:
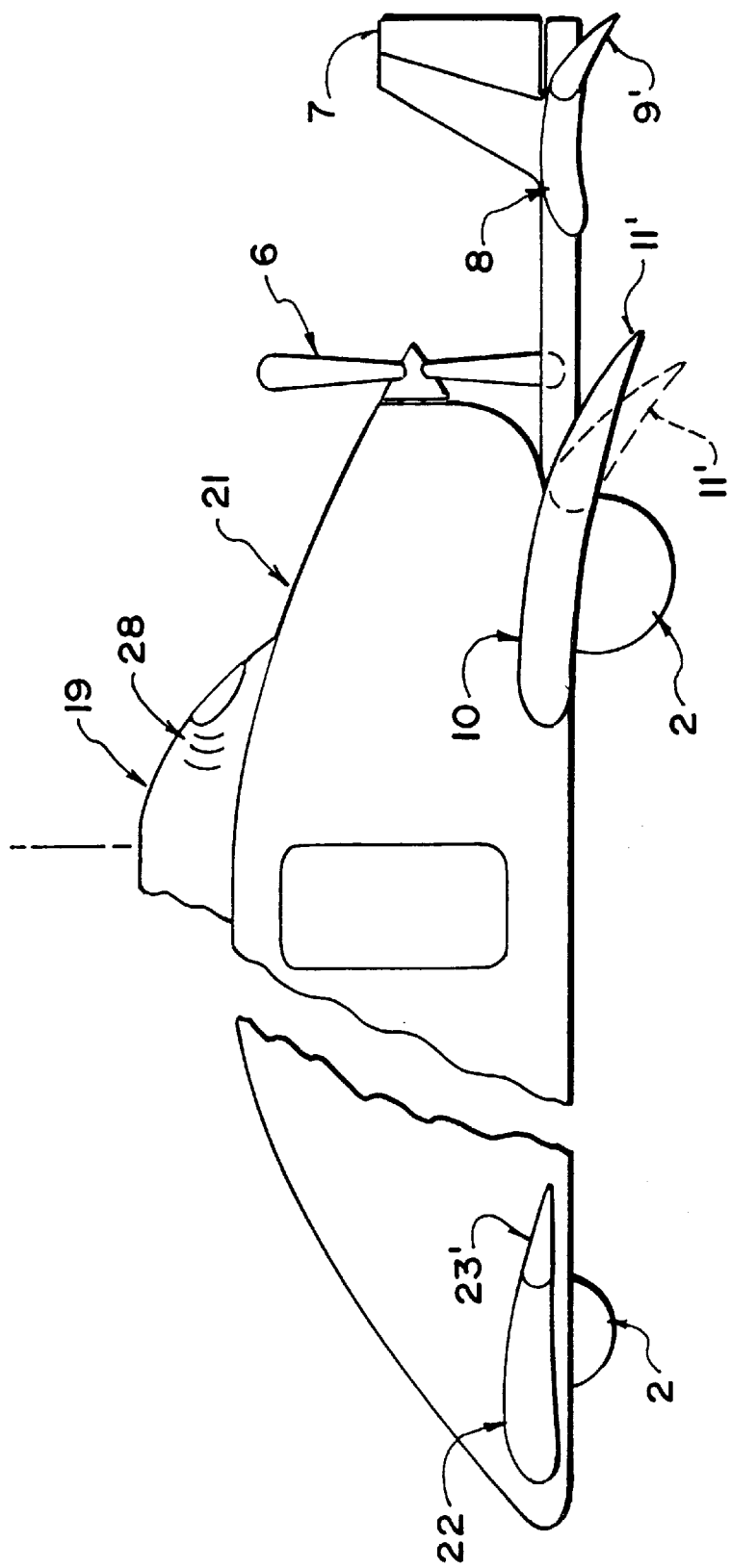
FIG. 9 is a partial, side view of the embodiment of FIG. 8.

FIG. 9 illustrates an embodiment of the invention with a canard wing 22 and showing the control surfaces 9', 11' and 23', as well as louvers 28.

Functional description of the invention:

An aircraft according to the present invention has twin counter rotating rotors which eliminate the need for a tail rotor. One of the rotors has mounted on it a circular airfoil which will do a number of things. It will weight the tips, giving the aircraft Gyro stability. It will give the aircraft lift no matter which direction it turns or moves horizontally. It will also tie the rotors together helping them to function more like a single disc. It will have a synergistic effect, improving the lift characteristics of both the rotors and the CA. The second CA shown as 5 in FIG. 1 is a small, light weight structure compared to the primary CA, mostly to act as a tie to make that set of blades more rigid and function more like a disc. Because these blades would be weighted less than the others the Gyro effect of the counter rotated rotors would not cancel out. To take advantage of this, the vertical take off and land (VTOL) aircraft will normally be flown like a flying saucer, i.e. it will not bank in a turn like a normal aircraft or helicopter, instead it will just rotate in the vertical plane and fly in the new direction. It will have twin engines and a twin drive system, the engines will have a speed control so after warm up with the speed control on, the rotors and the propeller will at the same speat the same speed thus maintaining Gyro stability and simplifying operation. To make turns more comfortable for pilot and passengers the seats could swing over like a pendulum in a turn. In helicopter mode it will climb or descend by changing the pitch on the rotors and the forward speed will be varied by changing the pitch on the propeller, 6. Therefore it will normally fly using only the three controls, rudder and two pitch controls. However it will have a gimbaled control stick to tilt the mast in case it happens to move (precess), which can happen with Gyros when an external force is exerted on the Gyro, which in this case is the circular airfoil. Instead of using the stick, the flaperons could be used for this small trim function. This stick could also be used if a pilot wanted to fly it like a standard gyro-plane or helicopter for training purposes. In normal operation these controls would be used infrequently therefore the wear & tear and maintenance on them would be minimal. The flaperons, 11 & 11' and 9 & 9', when installed would function in the first few degrees of the stick control, before the mast begins to move and would act like trim controls. This aircraft would be very easy to operate by radio control because of the, built in, Gyro stability, and because there would only be the three controls in normal operation i.e. pitch for elevation, pitch for speed and rudders for direction, the other control that would be need at times would be the flaperons.

One advantage of this design is the flexibility allowed so that if the manufacturer wanted to sell a starter model it could do so by building an alternate version like that shown in FIGS. 7 and 8 without the circular airfoil and at a later date add the CA. There would be some disadvantages for example without the CA the spacing as indicated in FIG. 1 as, x , would have to be increased because without the CA the individual rotor blades would act more independent and less like a solid disc as illustrated in FIG. 1, in other words the CA ties the three rotor blades together so one tends to support the other. Also the FIG. 8 version would not convert to the more efficient, high speed, forward mode as efficiently, or at as low a speed, because of less lift without the CA; and at high speeds it would not have the CA to hide the rotor blades from wind resistance. Also because the rotors could not likely be feathered all the way, they would create more resistance. Flat turns would be more difficult because again the rotors would not act as much like discs in conjunction with the CA and give equal lift no matter what direction it's moving through the air. However it would be cheaper and still function in the three modes.

The invention described and claimed herein is useful for various applications. It has application for all missions requiring vertical takeoff and hover capability. It is also suitable for military transport, attack, scout, and liaison missions. It could be used as a Navy aircraft operating from smaller ships other than aircraft carriers. Additionally, this aircraft could easily be adapted as a remotely piloted vehicle with various military and commercial applications. Commercially, it would be a useful transport aircraft, particularly as a commuter or general aviation/business aircraft, and for aerial surveillance. The concepts of Gyro stabilization, no tail rotor, ease of flying, safety and high-speed capability make this aircraft more attractive than previous high-speed rotor craft concepts.

Although exemplary embodiments of the invention have been shown and described, many changes, modifications, and substitutions may be made by one having ordinary skill in the art without departing from the spirit and scope of the invention. Therefore, the invention is not to be limited except by the scope of the claims.

What is claimed is:

1. In a helicopter main rotor of the type producing lift when rotated about a rotor axis, the rotor including a hub and a plurality of rotor blades radiating from the hub, each rotor blade having an airfoil cross-section for generating lift in response to rotation of the rotor, the improvement comprising:

a circular airfoil comprising an annular element with an airfoil cross section mounted on outer ends of the rotor blades, coaxially with the hub for generating lift in response to movement of the rotor in a forward direction transverse to the rotor axis, whereby on rotation of the rotor, the rotor blades produce a lift generating flow of air across the circular airfoil.

2. A rotor according to claim 1 wherein the cross section of the circular airfoil has a cambered configuration.

3. A rotor according to claim 1 wherein the circular airfoil has a peripheral spoiler.

4. An aircraft including a rotor according to claim 1 and further comprising two engines and drive systems coupling the two engines to the rotor for rotating the rotor.

5. An aircraft including a rotor according to claim 1 and further comprising a projectile launched parachute system.

6. An aircraft including a rotor according to claim 1 and further comprising a second rotor of the type producing lift when rotated about the rotor axis, the two rotors being coaxial and axially spaced apart, the second rotor including:

a plurality of second rotor blades radiating from said hub, each second rotor blade having an airfoil cross-section for generating lift in response to rotation of the rotor; and a second circular airfoil comprising an annular element with an airfoil cross section mounted on outer ends of the second rotor blades, coaxially with the hub for generating lift in response to movement of the rotor in a forward direction transverse to the rotor axis, whereby on rotation of the rotor, the second rotor blades produce a lift generating flow of air across the second circular airfoil.

7. An aircraft according to claim 6 wherein one of the circular airfoils is smaller than the other circular airfoil.

8. An aircraft including a rotor according to claim 1 including motor means for driving the rotor and means for selectively disengaging the motor means from the rotor.

9. A rotor according to claim 1 wherein the circular airfoil has a chord of up to 20% of the rotor radius and a thickness about 15% of the airfoil chord.

10. An aircraft comprising:

a first rotor of the type producing lift when rotated about a rotor axis, the first rotor including:
 a first rotor hub;
 a plurality of first rotor blades radiating from the hub, each first rotor blade having an airfoil cross-section for generating lift in response to rotation of the rotor; and a circular airfoil comprising an annular element with an airfoil cross section mounted on outer ends of the rotor blades, coaxially with the hub for generating lift in response to movement of the rotor in a forward direction transverse to the rotor axis;

a second rotor coaxial with and axially spaced from the first rotor, and of the type producing lift when rotated about the rotor axis, the second rotor including:

a second rotor hub;

a plurality of second rotor blades radiating from the second rotor hub, each second rotor blade having an airfoil cross-section for generating lift in response to rotation of the rotor;

a second circular airfoil comprising an annular element with an airfoil cross section mounted on outer ends of the plurality of second blades, coaxially with the hub for generating lift in response to movement of the rotor in a forward direction transverse to the rotor axis; and drive means for rotating the first and second rotors in opposite directions about the rotor axis, whereby on rotation of the rotors, the rotor blades produce a lift generating flow of air across each of the circular airfoils.

* * * * *